No. 639,641. Patented Dec. 19, 1899.
N. R. WILSON & J. D. PERKINS.
HYDRANT PLUG.
(Application filed Apr. 3, 1899.)
(No Model.)
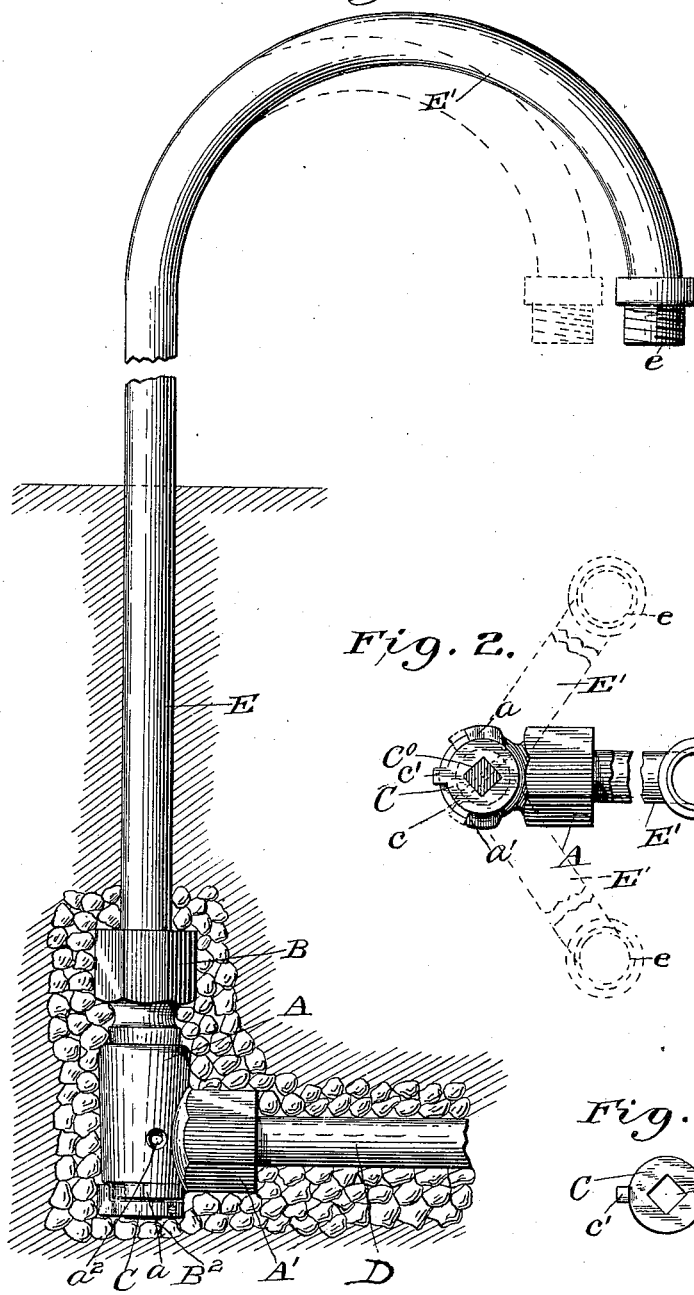
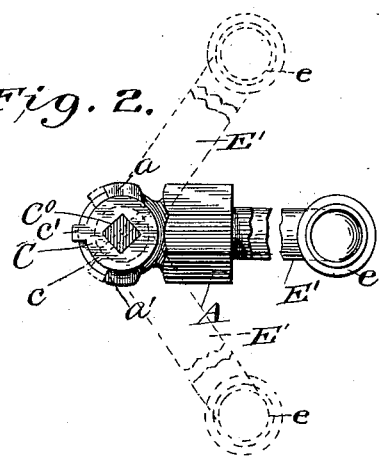
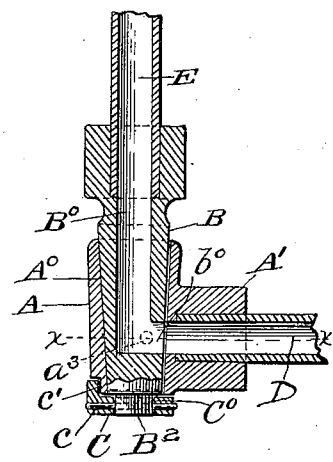
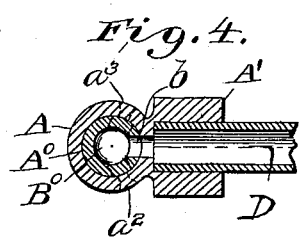
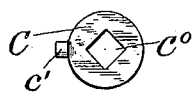
Witnesses
Jas H Hackwood
John Andrews Wilson
Inventors
N. R. Wilson
J. D. Perkins
by Wilkinson & Fisher
Attorneys
THE NORRIS PETERS CO., PHOTO-LITHO., WASHINGTON, D. C.

UNITED STATES PATENT OFFICE.

NOAH REEVE WILSON AND JAMES DANIEL PERKINS, OF GREENVILLE, SOUTH CAROLINA, ASSIGNORS OF ONE-THIRD TO HENRY BRIGGS, OF SAME PLACE.

HYDRANT-PLUG.

SPECIFICATION forming part of Letters Patent No. 639,641, dated December 19, 1899.

Application filed April 3, 1899. Serial No. 711,568. (No model.)

*To all whom it may concern:*

Be it known that we, NOAH REEVE WILSON and JAMES DANIEL PERKINS, citizens of the United States, residing at Greenville, in the county of Greenville and State of South Carolina, have invented certain new and useful Improvements in Hydrant-Plugs; and we do hereby declare the following to be a full, clear, and exact description of the invention, such as will enable others skilled in the art to which it appertains to make and use the same.

Our invention relates to improvements in hydrant-plugs especially adapted for connecting hose for watering lawns, flower-gardens, and the like; and it consists in the novel construction hereinafter described and claimed.

Our invention will be understood by reference to the accompanying drawings, wherein the same parts are indicated by the same letters throughout the several views.

Figure 1 represents a side elevation of our invention, showing the earth and stone filling in section and illustrates the manner of setting the device. Fig. 2 is a plan view of the under side of the plug. Fig. 3 is a central vertical section through the plug and casing. Fig. 4 is a section taken on the line 4 4 in Fig. 3; and Fig. 5 is a detail plan view of the stop-disk, which is fitted upon the bottom end of the plug.

A represents the plug-casing, having horizontal connection A' and valve-seat $A^0$ extending therethrough at right angles to the horizontal connection.

B represents a turning plug fitted in the valve-seat and provided with axial opening $B^0$ and radial opening $b^0$, the latter being arranged to be turned into communication with the horizontal connection of the casing, as shown most clearly in Figs. 3 and 4. The bottom end of the plug B is solid and has a squared reduced portion $B^2$, which extends beyond the lower end of the valve-seat, as also seen in Fig. 3.

The casing A is cut away along a portion of its lower edge, forming stops $a$ and $a'$.

A disk C, having a squared opening $C^0$ therethrough, is fitted over the squared end $B^2$ of the plug and secured thereon by means of a pin $c$, which passes through a radial opening in said disk and an axial opening in said squared projection. The said disk is provided with a peripheral lug $c'$, which extends radially and axially therefrom and is arranged to limit the rotation of the plug B by coming in contact with either of the stops $a$ or $a'$ upon the plug-casing.

$a^2$ and $a^3$ represent two openings in the casing A, so arranged upon either side of the horizontal connection A' thereof that when the radial opening $b^0$ in the plug has been turned entirely past the opening of the said horizontal connection in either direction the said radial opening will be brought into communication with the one or the other of these two openings $a^2$ and $a^3$.

From the foregoing it will be seen that when the plug is in the position by which the radial opening therein communicates with the horizontal or inlet connection of the casing water may flow through the plug from the said inlet connection, which is fitted with an inlet-pipe D. Now when this plug is turned to the one side or the other to its fullest extent, as limited by the stops hereinbefore described, the inlet connection of the casing will be closed by the plug, while the radial opening in the said plug will be in communication with one or the other of the openings $a^2$ and $a^3$, and in this position the water in the outlet-pipe E may drain out of the plug. The outlet-pipe E is formed with a curved neck E', provided with a connection $e'$ for a hose. (Not shown.) The inlet-pipe and the plug in this casing are buried beneath the surface of the ground sufficiently to avoid freezing and are preferably packed around with stones, so as to permit the water to drain from the plug more readily.

The plug may be opened and closed by swinging the curved neck E' in a horizontal plane, there being but one open position and two closed positions, the former being midway between the two latter, so that, the plug being closed, when it is desired to open the same the neck is swung to its intermediate position, which movement opens the plug.

As above described, it will be seen that the plug may be closed and the water turned off by swinging the neck to its extreme limit in either direction from the open position.

The simplicity and the many advantages of our improved device will be apparent to any practical mind.

Having thus described our invention, what we claim as new, and desire to secure by Letters Patent of the United States, is—

In a hydrant-plug, the combination with a plug-casing having a vertical valve-chamber with drain-openings upon opposite sides thereof, and an inlet connection communicating with the side of said valve-chamber; of a hollow turning plug having open upper end, closed lower end, and a radial opening arranged in the plane of said inlet connection and said drain-openings; stops on said casing; a disk on said plug arranged to strike said stops and limit the movement of said plug; and an elongated spout rigidly fitted within the open end of said plug and extending axially therefrom, substantially as described.

In testimony whereof we affix our signatures in presence of two witnesses.

NOAH REEVE WILSON.
JAMES DANIEL PERKINS.

Witnesses:
G. P. HAMMETT,
J. F. DORROH.